Inventors
Donald B. McIlvin
Fred F. Chellis
Charles R. Campbell, Jr.
By their Attorney March 19, 1957
D. B. McILVIN ET AL
2,785,400
FASTENER INSERTING DEVICES
Filed Dec. 1, 1955
3 Sheets-Sheet 2
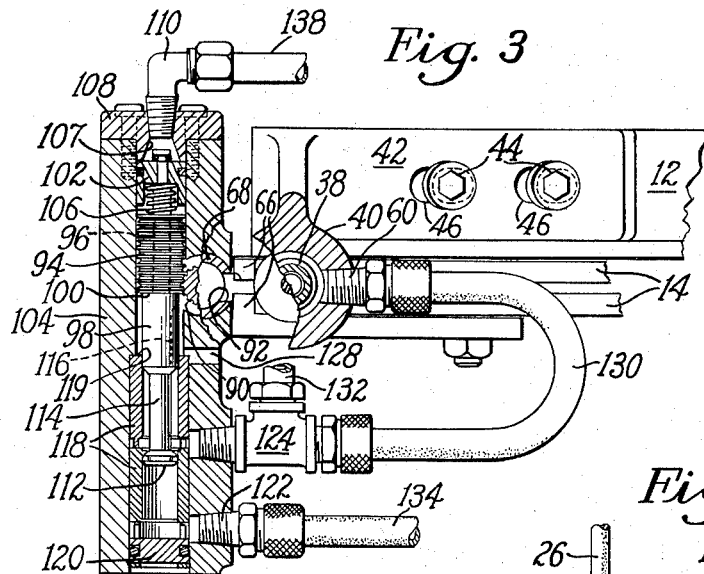
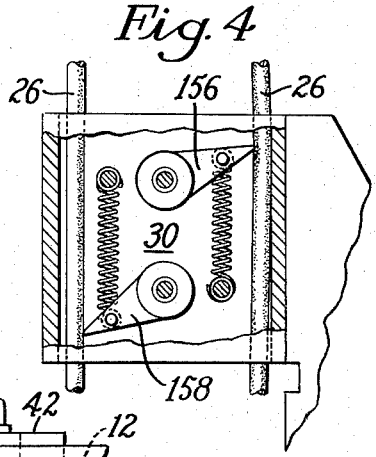
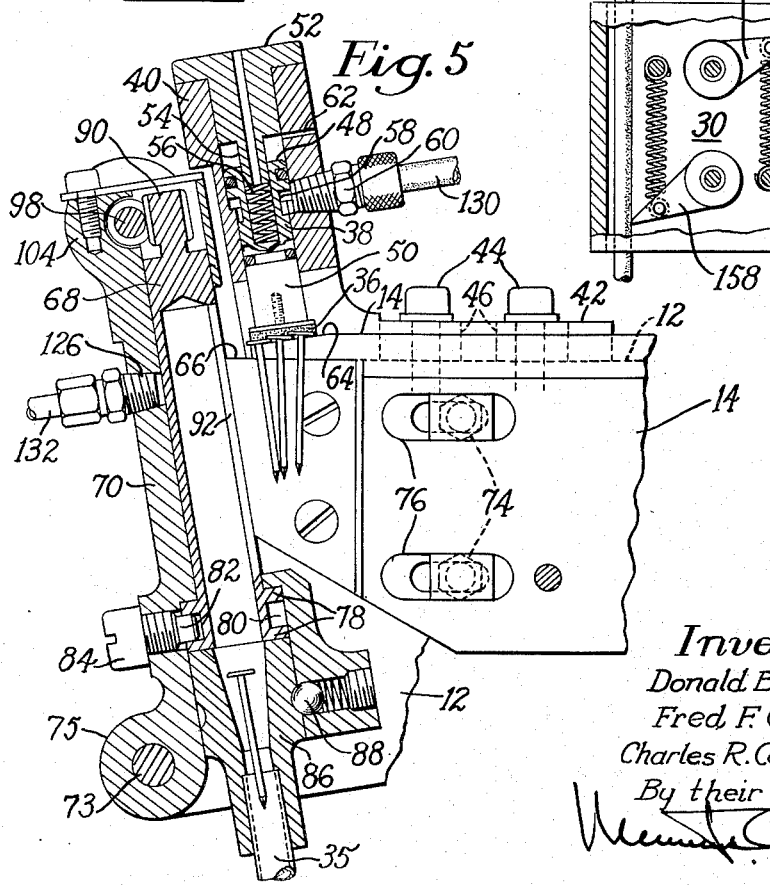
*Inventors*
Donald B. McIlvin
Fred F. Chellis
Charles R. Campbell, Jr.
By their Attorney March 19, 1957    D. B. McILVIN ET AL    2,785,400
FASTENER INSERTING DEVICES
Filed Dec. 1, 1955    3 Sheets-Sheet 3

Inventors
Donald B. McIlvin
Fred F. Chellis
Charles R. Campbell, Jr.
By their Attorney United States Patent Office 2,785,400
Patented Mar. 19, 1957

2,785,400

FASTENER INSERTING DEVICES

Donald B. McIlvin, Danvers, Charles R. Campbell, Jr., Beverly, and Fred F. Chellis, Manchester, Mass., assignors to United Shoe Machinery Corporation, Flemington, N. J., and Boston, Mass., a corporation of New Jersey Application December 1, 1955, Serial No. 550,324

9 Claims. (Cl. 1—6)

This invention relates to fastener inserting and more particularly to manually operated, automatic feed devices for inserting fasteners. Newly developed portable driving tools, such as pneumatic nail and screw drivers, require that fasteners be fed to them in alined relationship, that is, with their headed or pointed ends extending in the same direction. In order to operate such tools in an automatic or semi-automatic manner it is essential that they have feeding mechanisms capable of continuously delivering the properly alined fasteners one at a time in response to each completed driving cycle of the tool as fast as the tool is capable of consuming them. Furthermore, many such driving tools are constructed to operate at very high speeds, often the maximum speed being greater than an operator is capable of fully utilizing. Therefore, to approach maximum efficiency and production, the operator should be able to devote his full attention to the actual driving operation without interruptions such as those occasioned by attempts to remedy ineffective or improper feeding, etc. Thus a requirement of an automatic fastener feeding mechanism in addition to having a speed equal to that of the driving tool, is reliability of operation particularly over long periods.

It is an object of the present invention to provide a manually operated fastener inserting device having a power driven inserting tool and automatic mechanism capable of feeding it as rapidly as the fasteners are consumed by the inserting tool.

Another object is to provide a reliable device for automatically and continuously feeding a fastener driving tool in response to the operation of the tool, the feeding device requiring a minimum amount of attention from an operator.

An improved mechanism for alining nails and screws, etc., with respect to their ends, is disclosed in an application for United States Letters Patent Serial No. 534,833, filed September 16, 1955 in the name of Donald B. McIlvin, one of the present inventors. It is still another object of the present invention to provide a mechanism for rapidly transferring fasteners to a driving tool in response to a signal from the tool, the fasteners first being oriented with respect to their ends by mechanism similar to that disclosed in the above-mentioned application to McIlvin.

A further object of this invention is to provide a fastener inserting device in which all of the component parts including the alining element, the feeding element and the driving tool are operated by a single power source, as for example, compressed air.

In accordance with the objects and as a feature of this invention there is provided an apparatus for inserting fasteners and the like comprising, a driving tool, a hopper for holding a supply of randomly oriented fasteners, means to transfer the fasteners from the hopper to a raceway wherein all of the fasteners are alined with respect to their ends, and means for separating fasteners one at a time from the raceway into a delivery conduit through which they are propelled to the driving tool. To accomplish the separation and delivery of the fasteners there is provided mechanism which is automatically responsive to a signal from the driving tool each time it is actuated. The means for separating the fasteners one at a time from the raceway and transferring them to the delivery conduit comprises a fluid actuated releasing mechanism cooperating with the raceway and a slotted sleeve into which each of the released fasteners falls. The sleeve, rotated by a mechanism which moves in response to a pneumatic signal from the inserting tool, moves between an open position wherein a fastener may pass through the slot and fall into the delivery conduit and a closed position wherein the wall of the sleeve prevents the passage of fasteners. Associated with the rotating mechanism are valve means for directing fluid flow to the releasing means and also to direct fluid flow under pressure into the sleeve and through the delivery conduit to propel a previously released fastener to the driving tool. Means are also provided to assure that a fastener will not pass into the slotted sleeve and thence to the delivery conduit before the pressurized fluid is directed therethrough to propel the previously released fastener to the gun. To eliminate jamming of fasteners at the driving tool means comprising a time delay valve and a fluid accumulator are provided to assure that the separating and transferring mechanism is not actuated until the tool has completed its operation of driving a preceding fastener.

The above and other features of the invention including various and novel details of construction and combinations of parts will now be more particularly described with reference to the accompanying drawings and pointed out in the claims.

In the drawings,

Fig. 3 is a plan view partly in section of operating mechanism shown in Fig. 1 for separating a single fastener, transferring it to a delivery conduit and propelling it therethrough under pressure;

Fig. 4 is a detail view partly in section of a clutch mechanism for operating a portion of the device shown in Fig. 1;

Fig. 5 is a side elevation partly in section of the mechanism shown in Fig. 3.

Figure 1:
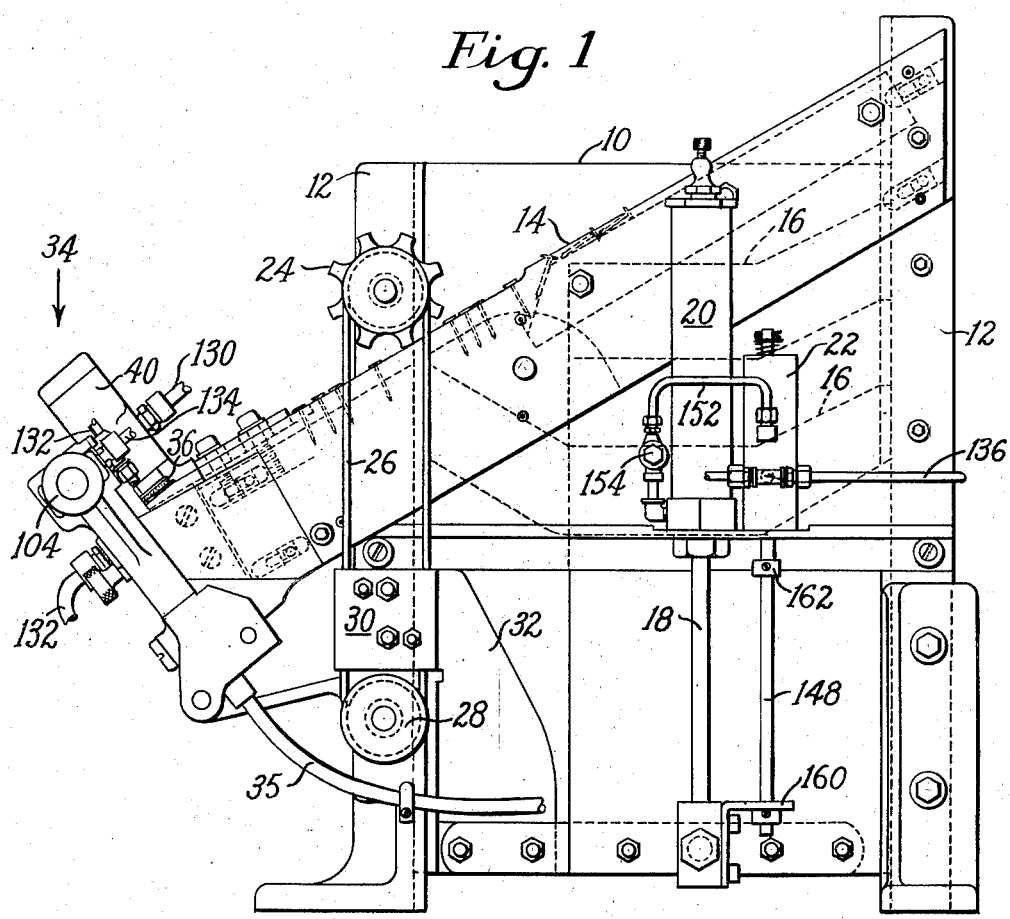
Fig. 1 is a side elevation of a device embodying the invention for alining fasteners with respect to their ends and for transferring them one at a time under pressure through a delivery conduit.

The general organization of a feeder-separator embodying the invention is shown in Fig. 1. A hopper 10 for holding a supply of randomly oriented fasteners, such as nails or screws, is secured to a main frame 12 which may be mounted on a bench or other suitable support. Forming one side of the hopper is an elevating mechanism for lifting fasteners from the hopper and delivering them to a downwardly inclined, slotted raceway 14 along which the fasteners slide in a uniformly alined relationship, suspended by their heads. The hopper, elevating mechanism and raceway are identical with those disclosed in the above-mentioned copending McIlvin application and are herein described only briefly. The elevating mechanism comprises a plurality of lift slides 16 connected by means of a piston rod 18 to an air motor 20 which is controlled by a valve 22 for reciprocating the slides. Associated with the raceway 14 which is adjustable widthwise to accommodate various types and sizes of fasteners is a rotary rejector 24 to expel any misalined fasteners from the raceway. The rejector is journaled in the frame 12 and is operated by means of a continuous flexible belt 26 passing around a pulley 28 and driven by a pawl clutch 30 which is operatively connected by means of a bracket 32 to the lift slides. Secured to the frame 12 and mounted at the lower end of the downwardly inclined raceway 14 is a separating and feeding mechanism 34 which separates the endmost fastener from those in the raceway and delivers it under pressure through a delivery tube 35 to an inserting device, such as a pneumatic nail or screw driving gun, in response to a signal from the driving device. The separating mechanism 34 is pneumatically operated, being connected to the same source of pressurized air as are the inserting device and the motor 20 which operates the lift slides 16 and the rotary rejector 24.

Referring to Fig. 5, the separating mechanism comprises a presser foot 36 of rubber or similar material which is arranged to be moved toward and away from the lower end of the raceway 14 to engage and then release the heads of fasteners, herein illustrated as nails, as they slide down the raceway. The presser foot 36 is secured to a piston 38 which reciprocates within a two-diameter cylinder 40 mounted on a bracket 42 which is adjustably secured to the frame 12 by screws 44 passing through elongated slots 46 in the bracket. The upper end of the piston 38 has formed thereon a piston head 48 of larger diameter than the lower portion 50 of the piston. A plug 52 is fitted in the upper end of the cylinder 40 and has a downwardly extending apertured projection 54 freely entering a mating recess in the piston. Compressed between the projection 54 and the piston 38 is a spring 56 which urges the piston and presser foot toward the raceway 14. Separating the piston head 48 from the lower portion 50 of the piston is a necked area 58. An air inlet fitting 60 is threaded in the cylinder 40 and is so located as to be adjacent the necked area 58 when the piston is in the position seen in Fig. 5. Formed in the cylinder 40 above the fitting 60 is a passage 62 to relieve air pressure above the piston head 48 when the piston is moved upwardly. The presser foot 36 is normally urged toward the raceway 14 by the spring 56 acting on the piston 38, and when pressurized air is introduced through the fitting 60, the piston is raised compressing the spring. The air, acting on the piston, exerts a greater force in an upward direction than in a downward direction because the piston head 48 has a greater area than the lower portion 50.

Figure 2:
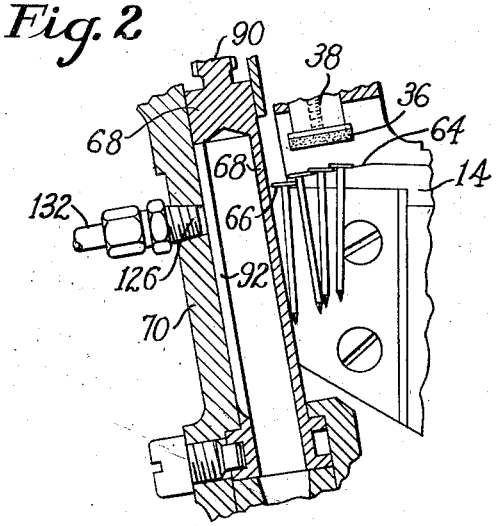
Fig. 2 is a side elevation, partly in section, on a larger scale of mechanism shown in Fig. 1 for releasing fasteners one at a time from a raceway.

As seen in Figs. 2 and 5, the lower end of the raceway 14 is sloped along a portion 64 substantially parallel to the bottom of the presser foot 36. The sloped portion 64 terminates abruptly exposing a shoulder or receiving area 66 extending beyond the presser foot and spaced slightly below the portion 64. The receiving area 66 forms an acute angle with the axis of the piston 38. In its lower position, as seen in Fig. 5, the presser foot engages the heads of the nails spaced along the portion 64, and when the presser foot is elevated, the endmost nail will fall onto the receiving area 66 (Fig. 2), the remaining nails each moving downwardly along the sloping raceway to take the position of the one just preceding it. Only one nail at a time is permitted to fall onto receiving area 66, as will be seen hereinafter.

Adjacent the receiving area 66 is located a sleeve 68 rotatably mounted in a housing 70 which is secured to the frame 12 by means of a screw 73 threaded in the frame 12 and passing through an ear 75 formed on the housing 70. On the lower end of the sleeve 68 is a double flange 78 with an annular recess 80 formed therebetween. A projection 82 on the end of a screw 84 threaded in the housing 70 enters the recess 80 permitting the sleeve to rotate while preventing axial movement relative to the housing. The end of the flexible delivery conduit 35, for conducting fasteners to the inserting device, is held adjacent the lower end of the sleeve 68 by means of a fitting 86 removably secured within the housing 70 by means of a spring-biased detent 88 or equivalent means. A pinion 90 is located on the upper end of the sleeve 68, and in one side of the sleeve between the pinion and the flanges 78 is formed an axially extending elongated slot 92. In one position of rotation of the sleeve, the slot 92 faces the receiving area 66, and in a second position the closed wall of the sleeve 68 faces the receiving area.

As seen in Fig. 2, when the head of a fastener, such as a nail, is on the receiving area 66 and the slot 92 turned away therefrom, its pointed end bears against the wall of the sleeve since the receiving area is angularly disposed relative to the axis of the sleeve, as well as the axis of the presser foot piston 38, the axes being parallel. The spacing of the raceway relative to the sleeve determines the size of the receiving area 66 permitting the nail head to be accurately positioned thereon, the raceway being adjustable toward and away from the sleeve by means of screws 74 passing into the frame 12 through elongated slots 76 in the raceway. The shank of the next nail in line on the slope 64 is in contact with the head of the nail on the receiving area (Fig. 2). Thus, it is impossible for the second nail in line to move onto the receiving area until the first nail has been removed. When the sleeve 68 is rotated to a position wherein the slot 92 faces the receiving area, the presser foot will again have contacted the nails on the sloped portion 64 as will be hereinafter described and the nail on the receiving area drops off into the sleeve and is free to be conveyed through the conduit 35 to the inserting gun by means hereinafter described. The remaining nails stay motionless on the slope 64 of the raceway until the presser foot 36 is moved upwardly to release the next nail. It is within the scope of this invention to construct the apparatus with the slope 64 continued downwardly to a point where it is almost in contact with the sleeve 68 whereby the stepped receiving area 66 would be eliminated. The device would operate in the same manner except that the head rather than the point of the endmost nail released by the presser foot would be in engagement with the wall of the sleeve. The means for rotating the sleeve will now be described.

Engaging the pinion 90 (Fig. 3) is a rack 94 movable along a rod 96 of a piston 98 between a shoulder 100 on the piston and the face of a recessed piston head 102. The piston 98 is slidable within a cylinder 104 which forms the upper portion of the housing 70. The piston head 102 has the largest diameter of any portion of the piston. Urging the rack 94 away from the piston head 102 is a compression spring 106. The forward end of the piston rod 96 is accommodated within a relieved portion 107 in a cap 108 which is secured to and forms an airtight end on the cylinder 104. An air inlet fitting 110 is threaded in the cap 108 to conduct high pressure air into the cylinder 104. On the rearward end of the piston, as seen in Fig. 3, there is formed a second piston head 112, and separating the head 112 from the mid-portion of the piston is a necked area 114. A milled slot 116 extends longitudinally of the mid-portion from the necked area almost to the shoulder 100. The head 112 forms an airtight connection between the piston and a two part sleeve 118 fitted within the cylinder 104. An airtight cap 120 closes the rearward end of the cylinder. Threaded in the cylinder 104 near the rearward end as seen in Fig. 3 is an air inlet fitting 122, and spaced therefrom is a second fitting 124, both fittings communicating with the interior of the sleeve 118. A third fitting 126 (Fig. 5) is threaded in the housing 70 whereby air may pass into the sleeve 68 when the sleeve is rotated to bring the slot into alinement therewith. The cylinder 104 is vented to atmosphere through the slot 116 and an opening 128 formed adjacent the mid-point of the sleeve 118. The fitting 124 is in the form of a T connection having one end connected to the fitting 60 in the presser foot cylinder 40 by means of an airtight conduit 130. The other branch of the T is connected to the fitting 126 by means of an airtight conduit 132. The fitting 122 is connected by means of an airtight conduit 134 to a pressurized line 136 (Figs. 1 and 6) which directs air to the air motor 20, and the fitting 110 is connected to a signal line 138 leading from an inserting gun.

Figure 6:
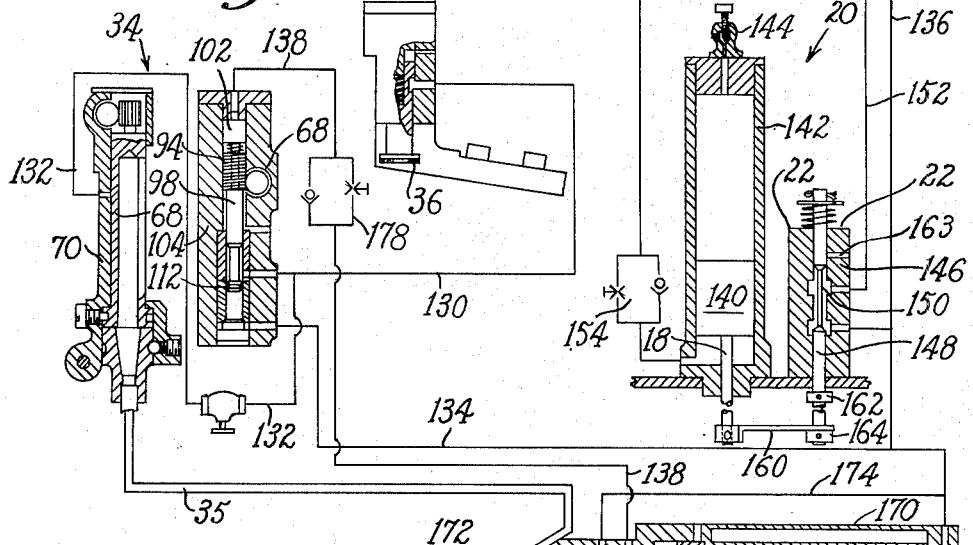
Figs. 6 and 7 are diagrammatical views of the device shown in Fig. 1 and its pneumatic circuit, Fig. 6 showing the apparatus as employed with a nail driving gun and Fig. 7 showing it as employed with a screw driver.

Fasteners are supplied continuously to the raceway 14 by means of the lift slides 16 (Fig. 1) which are reciprocated by means of the air motor 20. The fasteners slide down the raceway suspended by their heads to the point where they are engaged by the presser foot. Referring now to Fig. 6, the air motor 20 is identical with that disclosed in the above-mentioned McIlvin application and will be described herein only briefly. The air motor 20 comprises a piston 140 which reciprocates within a cylinder 142, the upper end of which is vented to atmosphere by means of a needle valve 144. The lift slides are connected to the piston 140 by means of the piston rod 18 and are also connected by the bracket 32 (Fig. 1) to the pawl clutch 30 which imparts movement to the rotary rejector 24. The valve 22 for controlling the motion of the piston 140 comprises a multi-diameter cylinder 146 in which is slidable a rod valve 148. The rod valve 148 fits snugly within the cylinder 146 so that it will remain in any position in which it is placed. Compressed air is admitted to the cylinder 146 through the line 136, then passes a necked portion 150 of the rod valve 148 when it is in the position shown in Fig. 6. The air then passes through a line 152, thence through a one way restricted flow valve 154 to the lower end of the cylinder 142 thereby raising the piston 140, the lift slides 16 and the pawl clutch 30. The clutch 30, shown in Fig. 4, comprises a pair of spring-biased pawls 156, 158 which alternatively grip and release the belt 26 as the clutch moves up and down to rotate the rejector wheel 24 as explained in the above-mentioned McIlvin application.

When the piston 140 reaches the upper end of its stroke, a bracket 160 which is fixed to the rod 18 and slides on the rod valve 148 abuts a collar 162 fixed on the rod valve moving it upwardly to shut off the pressurized line 136 from the line 152, the necked portion 150 of the rod valve 148 exposing an exhaust port 163 in the cylinder 146. Under the force of gravity the lift slides 16 and piston 140 drop, the air on the lower side of the piston 140 freely escaping through the restricted flow valve 154 and the exhaust port 163. In order that the lift slides do not move down too fast, the flow of air into the cylinder 142 is retarded by means of the needle valve 144. When the piston reaches the lower end of the stroke, the bracket 160 abuts a second collar 164 fixed on the rod valve 148 drawing it downwardly sealing the exhaust port 163 and again placing the pressurized line 136 in communication with the line 152, and the cycle is repeated. Thus, it will be seen that the lift slides are continuously reciprocated causing the nails to be delivered to the raceway 14 in an uninterrupted fashion. The nails then slide down the raceway until they are engaged by the presser foot 36, while the rotating wheel 24 rejects those not alined point downwardly.

A full cycle operation of the feeder separator in supplying nails to a pneumatic nail driving gun will now be described. The gun illustrated in Fig. 6 is identical with that disclosed in an application for United States Letters Patent Serial No. 487,317, filed February 10, 1955, in the name of Fred F. Chellis. Without describing the gun in detail it is sufficient to say that a nail is driven from the nosepiece 172 thereof when the gun is pressed against a work piece. The gun is operated pneumatically, being connected by a line 174 to the line 136 which leads from the supply of compressed air. Upon the firing of the gun, the signal line 138 is placed in communication with the pressurized line 174 due to the relative movement of the main part of the gun and a valve 176 which is located therein, as fully explained in the above-mentioned application of Chellis. The pressurization of the signal line 138 actuates the separating and feeding mechanism 34 to cause another nail to be blown to the gun through the delivery conduit 35 as explained below.

Just prior to the time the gun is fired there is no nail on the receiving area 66, the nail having occupied that position in the previous cycle then being in the delivery conduit 35 as will become more apparent hereinafter. The slot 92 in the sleeve 68 faces the receiving area, since the piston 98 is held in the position shown in Figs. 3 and 6 by the air pressure in the line 134 acting on the piston head 112, the signal line 138 being at atmospheric pressure.

Since the effective area of the head 102 is greater than that of the head 112, when the signal line 138 becomes pressurized to line pressure upon firing the gun, the piston 98 begins to move. This causes the rack 94 to rotate the sleeve 68, the slot 92 turning away from the receiving area 66 and the closed wall of the sleeve coming into contact therewith. The movement of the rack 94 is terminated when it strikes the forward end 119 of the sleeve 118. However, the piston continues its movement a short distance until the head 102 abuts the end of the rack, the spring 106 becoming compressed. At this time the piston head 112 is no longer in engagement with the sleeve 118 but occupies a position opposite the fitting 122 almost in contact with the plug 120 and pressurized air flows from the line 134 past the necked area 114 of the piston and into the T-shaped fitting 124. Up to this time there has been no movement of either the presser foot or the nail within the delivery conduit 35.

From the fitting 124 pressurized air flows through both lines 130 and 132. The pressurized air in the line 130 acts against the enlarged head of the presser foot piston 38 elevating the presser foot and permitting the endmost nail to drop onto the receiving area 66 with its pointed end in contact with the wall of the then closed sleeve 68 as explained above. The continued movement of the piston 98 after the rack has stopped assures that the sleeve 68 has been fully closed before the presser foot is elevated to allow the nail to drop onto the receiving area. While this is taking place the pressurized air in the line 132 enters the sleeve 68 through the slot 92 which is then opposite the fitting 126 and blows the nail which entered the delivery conduit 35 during the previous cycle to the inserting gun.

When the inserting gun 170 is removed from the work piece, the line 138 becomes depressurized and the pressurized air acting on the piston head 102 and that which is in the line 138 passes through a restricted flow value 178 to atmosphere through the center of the valve 176 and the nosepiece 172 as explained in the above-mentioned application of Chellis. Upon the depressurization of the line 138 the piston 98 begins to return to the position shown in Figs. 3 and 6 by the air acting against the piston head 112. Movement of the rack 94 is not instantaneous with the movement of the piston 98, the piston first moving due to the force of the spring 106 until the shoulder 100 contacts the rack. This slight delay in the movement of the rack is to assure sufficient time for the nail in the delivery conduit 35 to be blown to the gun and for the presser foot to move down before the sleeve 68 is rotated into open position to receive the nail which is then resting on the receiving area 66. The compressed air within the line 130 and any residual air in the line 132 passes to atmosphere through the slot 116 and the opening 128. Continued movement of the rack 94 rotates the sleeve into its original position with the slot 92 adjacent the receiving area 66 permitting the nail which was released by the presser foot onto the receiving area to fall through the sleeve 68 and into the conduit 35 ready to be blown to the gun during the next cycle. Thus, the mechanism has returned to its original position wherein there is one nail in the fastener inserting gun, one nail in the delivery conduit 35 ready to be blown to the gun, and a plurality of nails resting on the slope 64 of the raceway and held there by the presser foot. There is no nail on the receiving area 66 and the slot 92 in the sleeve 68 faces the receiving area.

Figure 7:
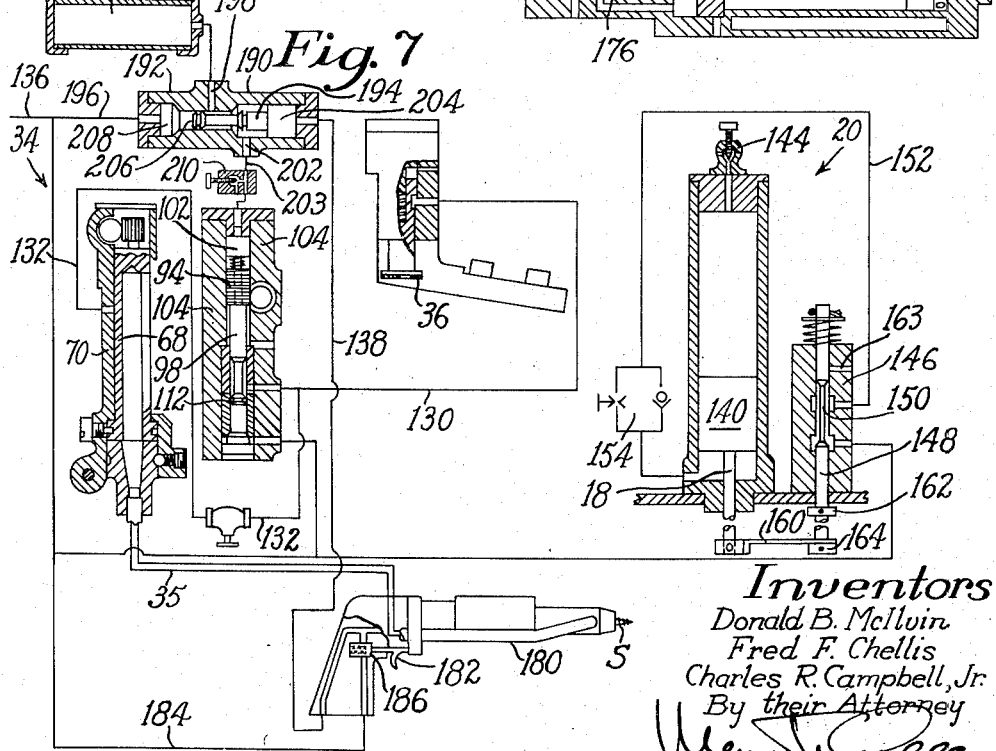

An alternative method of supplying screws to an automatic screw inserting gun is disclosed in Fig. 7. The automatic screw inserting gun 180 is of a well-known commercial type, not shown in detail, in which a screw S is rotatably driven by pneumatic means by actuating a trigger 182. The gun is connected by a line 184 to the source of compressed air passing through the line 136. Since it takes a greater period of time to insert a screw as distinguished from the almost instantaneous driving of a nail by means of the above-identified nail driver it is important that a succeeding screw be delivered to the gun only after the driving operation of the preceding screw is completed to avoid jamming. Consequently, the separating and feeding mechanism which is the same in both instances is controlled to deliver a screw only after the trigger 182 has been released. The signal line 138 is connected to the line 184 but interposed in the line 184 is a cutoff valve 186 which prevents the pressurization of the signal line 138 at all times except when the trigger 182 is actuated. Actuation of the trigger permits the flow of compressed air not only to the gun to drive a screw but also into the signal line 138.

The signal line 138 is not connected directly to the cylinder 104 as it is when a nail driving gun is employed but rather to a time delay valve 190. The time delay valve 190 comprises a two-diameter cylinder 192 having a two-diameter piston 194 slidable therein. The signal line 138 leads to the right-hand or larger diameter portion of the cylinder 190 and connected to the left-hand or smaller diameter portion is a line 196 communicating with the constantly pressurized line 136. Midway in the smaller diameter portion of the cylinder is an air passageway 198 connected to an air accumulator 200 and leading from the larger diameter portion of the cylinder is an air passageway 202 communicating with the upper end of the cylinder 104 by means of a line 203. The piston 194 has a large diameter head 204 fitting within the larger diameter portion of the cylinder and a head 206 fitting within the smaller diameter portion. The pressurized air in the line 196 maintains the piston 194 in the position shown in Fig. 7, while the signal line 138 is depressurized, the air acting against the head 206. However, upon actuating the trigger 182 to drive a screw the line 138 becomes pressurized to full line pressure and the piston 194 is moved to the left by the air pressure acting against the larger diameter piston head 204. The head 206 moves into a relieved area 208 and air in the line 196 then flows past the head 206 through the passageway 198 and into the air accumulator 200. However, no air may flow through the passageway 202 at this time, the middle portion of the piston 194 then forming an airtight seal in the right-hand end of the smaller diameter portion of the cylinder.

Upon releasing the trigger 182 after a screw has been driven the line 138 becomes depressurized, the compressed air therein passing to atmosphere through the gun and the piston 194 is returned to the right-hand position as shown in Fig. 7 by the air pressure in the line 196 and in the accumulator 200. When the piston 194 reaches the right-hand position, as seen in Fig. 7, the air passageway 202 is uncovered and the air in the accumulator is free to flow through line 203 into the cylinder 104 to actuate the feeding and separating mechanism 34. Some of the air flowing through line 203 escapes through a needle valve 210 which is adjustable to control the amount of air reaching the cylinder and thus the speed with which the piston 98 is moved. The cycle of operation of the feeding and separating mechanism 34 is identical with that described with reference to Fig. 6 except, of course, a screw is transferred rather than a nail. At the completion of the cycle the air acting on the piston 98 escapes through the needle valve 210.

Having thus described our invention, what we claim as new and desire to secure by Letters Patent of the United States is:

1. In an apparatus for transferring fasteners and the like, means for supporting a plurality of fasteners with their ends uniformly oriented with respect to each other, a downwardly inclined sleeve rotatably mounted adjacent said supporting means, a slot formed in said sleeve through which a fastener may pass from said supporting means when said sleeve is in one position of rotation, the wall of said sleeve preventing the passage of fasteners when it is in another position of rotation, a delivery conduit communicating with the lower end of said sleeve through which fasteners may pass to a predetermined destination, means for retaining fasteners on said supporting means and operable to release one fastener at a time therefrom, and control means for actuating said retaining and releasing means and for rotating said sleeve in timed sequence therewith, said control means including means for directing fluid under pressure into said sleeve and through said delivery conduit to propel a fastener therethrough after it has passed into said sleeve.

2. In an apparatus for transferring fasteners and the like, means for supporting a plurality of fasteners with their ends uniformly oriented with respect to each other, a downwardly inclined sleeve rotatably mounted adjacent said supporting means, a slot formed in said sleeve through which a fastener may pass from said supporting means when said sleeve is in one position of rotation, the wall of said sleeve preventing the passage of fasteners when it is in another position of rotation, a delivery conduit communicating with the lower end of said sleeve, means for retaining fasteners on said supporting means and operable to release one fastener at a time therefrom, control means responsive to an externally created signal for actuating said retaining and releasing means and for rotating said sleeve in timed sequence therewith, said control means including means for directing fluid under pressure into said sleeve and through said delivery conduit to propel a fastener therethrough after it has passed into said sleeve, and means for delaying the operation of said control means until the termination of said signal.

3. In an apparatus for transferring fasteners and the like, means for supporting a plurality of fasteners with their ends uniformly oriented with respect to each other, a downwardly inclined sleeve rotatably mounted adjacent said supporting means, a slot formed in said sleeve through which a fastener may pass from said supporting means when said sleeve is in one position of rotation, the wall of said sleeve preventing the passage of fasteners when it is in another position of rotation, a delivery conduit communicating with the lower end of said sleeve through which fasteners may pass to a predetermined destination, fluid actuated means for retaining fasteners on said supporting means and operable to release one fastener at a time therefrom, and control means comprising, an actuating member for rotating said sleeve and valve means associated with said actuating member for directing fluid flow to said retaining and releasing means to cause it to release a fastener and into said sleeve to propel the fastener through said delivery conduit only after it has passed into said sleeve.

4. In an apparatus for transferring headed fasteners and the like, an inclined raceway for supporting a plurality of fasteners with their heads uniformly oriented with respect to each other, a receiving area substantially the size of the head of a fastener located adjacent the lower end of said raceway, a downwardly inclined sleeve rotatably mounted adjacent said receiving area and having a slot formed therein, said receiving area being sloped toward said sleeve whereby a fastener located thereon will fall into said sleeve when the slot faces said receiving area and will be prevented from doing so when the slot faces away from said receiving area, a delivery conduit communicating with the lower end of said sleeve through which fasteners may pass to a predetermined destination, means for retaining fasteners in said raceway and operable to release one fastener at a time therefrom onto said receiving area, and control means for rotating said sleeve, said control means including means for actuating said retaining and releasing means and for directing fluid flow into said sleeve and through said delivery conduit to propel a fastener therethrough only when said slot faces away from said receiving area.

5. In an apparatus for transferring headed fasteners and the like, an inclined raceway for supporting a plurality of fasteners with their heads uniformly oriented with respect to each other, a receiving area substantially the size of the head of a fastener located adjacent the lower end of said raceway, a downwardly inclined sleeve rotatably mounted adjacent said receiving area and having a slot formed therein, said receiving area being sloped toward said sleeve whereby a fastener located thereon will fall into said sleeve when the slot faces said receiving area and will be prevented from doing so when the slot faces away from said receiving area, a delivery conduit communicating with the lower end of said sleeve through which fasteners may pass to a predetermined destination, fluid actuated means for retaining fasteners in said raceway and operable to release one fastener at a time from said raceway onto said receiving area, and control means comprising, an actuating member for rotating said sleeve, valve means associated with said actuating member for directing fluid flow to said retaining and releasing means and into said sleeve to propel a fastener through said delivery conduit only when said slot faces away from said receiving area.

6. In an apparatus for transferring headed fasteners and the like, an inclined raceway for supporting a plurality of fasteners with their heads uniformly oriented with respect to each other, a receiving area substantially the size of the head of a fastener located adjacent the lower end of said raceway, a downwardly inclined sleeve rotatably mounted adjacent said receiving area and having a slot formed therein, said receiving area being sloped toward said sleeve whereby a fastener located thereon will fall through said slot into said sleeve when said sleeve is in one position of rotation and will be prevented from doing so by the wall of the sleeve when it is in another position, a delivery conduit communicating with the lower end of said sleeve through which fasteners may pass to a predetermined destination, means for retaining fasteners in said raceway and operable to release one fastener at a time therefrom onto said receiving area, control means responsive to an externally created signal for actuating said retaining and releasing means and for rotating said sleeve in timed sequence therewith, said control means including means for directing fluid flow into said sleeve and through said delivery conduit to propel a fastener therethrough only after it has passed into said sleeve, and means for delaying the operation of said control means until the termination of said signal.

7. In an apparatus for transferring headed fasteners and the like, an inclined raceway for supporting a plurality of fasteners with their heads uniformly oriented with respect to each other, a receiving area substantially the size of the head of a fastener located adjacent the lower end of said raceway, a downwardly inclined sleeve rotatably mounted adjacent said receiving area and having a slot formed therein, a pinion on said sleeve, said receiving area being sloped toward said sleeve whereby a fastener located thereon will fall into said sleeve when said sleeve is in an open position with the slot facing said receiving area and will be prevented from doing so when said sleeve is in a closed position with the slot facing away from said receiving area, a delivery conduit communicating with the lower end of said sleeve through which fasteners may pass to a predetermined destination, fluid actuated means for retaining fasteners in said raceway and operable to release one fastener at a time from said raceway onto said receiving area, a slidable rack in engagement with the pinion on said sleeve for rotating said sleeve between said open and said closed positions, a valve movable with said rack to direct fluid flow to said retaining and releasing means and into said sleeve to propel a fastener through said delivery conduit, and means to delay said flow of fluid until said sleeve has been rotated into closed position.

8. In an apparatus for transferring headed fasteners and the like, an inclined raceway for supporting a plurality of fasteners with their heads uniformly oriented with respect to each other, a receiving area substantially the size of the head of a fastener located adjacent the lower end of said raceway, a downwardly inclined sleeve rotatably mounted adjacent said receiving area and having a slot formed therein, a pinion on said sleeve, said receiving area being sloped toward said sleeve whereby a fastener located thereon will fall into said sleeve when said sleeve is in an open position with the slot facing said receiving area and will be prevented from doing so when said sleeve is in a closed position with the slot facing away from said receiving area, a delivery conduit communicating with the lower end of said sleeve through which fasteners may pass to a predetermined destination, fluid actuated means for retaining fasteners in said raceway and operable to release one fastener at a time from said raceway onto said receiving area, and control means comprising, a slidable member movable relative to said sleeve, a rack mounted on said slidable member in engagement with the pinion on said sleeve for rotating said sleeve between said open and said closed positions, a valve on said slidable member to direct fluid flow to said releasing means and into said sleeve to propel a fastener through said delivery conduit, and means to delay said flow of fluid until said sleeve has been rotated into closed position.

9. In an apparatus for transferring headed fasteners and the like, an inclined raceway for supporting a plurality of fasteners with their heads uniformly oriented with respect to each other, a receiving area substantially the size of the head of a fastener located adjacent the lower end of said raceway, a downwardly inclined sleeve rotatably mounted adjacent said receiving area and having a slot formed therein, a pinion on said sleeve, said receiving area being sloped toward said sleeve whereby a fastener located thereon will fall into said sleeve when said sleeve is in an open position with the slot facing said receiving area and will be prevented from doing so when said sleeve is in a closed position with the slot facing away from said receiving area, a delivery conduit communicating with the lower end of said sleeve, fluid actuated means for retaining fasteners in said raceway and operable to release one fastener at a time from said raceway onto said receiving area, a slidable rack in engagement with the pinion on said sleeve for rotating said sleeve between said open and said closed positions, a valve movable with said slidable rack to direct fluid flow to said retaining and releasing means and into said sleeve to propel a fastener through said delivery conduit.

References Cited in the file of this patent
UNITED STATES PATENTS

| | | |
|---|---|---|
| 1,479,804 | Gouldbourn | Jan. 8, 1924 |
| 1,703,458 | Ruff | Feb. 26, 1929 |
| 2,498,503 | Papalia | Feb. 21, 1950 |